US012707504B2

(12) United States Patent
Xiong et al.

(10) Patent No.: US 12,707,504 B2
(45) Date of Patent: Aug. 11, 2026

(54) METHOD AND APPARATUS FOR CONFIRMATION OF RANDOM ACCESS RESOURCES

(71) Applicant: Samsung Electronics Co., Ltd., Gyeonggi-do (KR)

(72) Inventors: Qi Xiong, Beijing (CN); Feifei Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 332 days.

(21) Appl. No.: 18/511,311

(22) Filed: Nov. 16, 2023

(65) Prior Publication Data

US 2024/0172292 A1 May 23, 2024

(30) Foreign Application Priority Data

Nov. 17, 2022 (CN) ........................ 202211461038.X

(51) Int. Cl.
*H04W 74/0833* (2024.01)
*H04W 72/0453* (2023.01)

(52) U.S. Cl.
CPC ... *H04W 74/0833* (2013.01); *H04W 72/0453* (2013.01)

(58) Field of Classification Search
CPC . H04W 72/04; H04W 72/0453; H04W 74/00; H04W 74/08; H04W 74/0833
See application file for complete search history.

(56) References Cited

U.S. PATENT DOCUMENTS 11,497,052 B1 11/2022 Zhang et al.
12,213,180 B2 * 1/2025 Kundu .............. H04W 74/0808
12,432,705 B2 * 9/2025 Huang .............. H04W 72/0453
12,495,440 B2 * 12/2025 Khoshkholgh Dashtaki ............... H04W 74/006
2008/0130588 A1 * 6/2008 Jeong .................. H04W 74/002 370/335
2019/0215877 A1 * 7/2019 Qian ................... H04L 27/0014
2020/0275483 A1 * 8/2020 Li ......................... H04L 5/0078
2020/0275493 A1 * 8/2020 Park .................. H04W 74/0833
2020/0296635 A1 * 9/2020 Rastegardoost ...... H04L 5/0048
2020/0374943 A1 11/2020 Sun et al.

(Continued)

FOREIGN PATENT DOCUMENTS

EP 3 627 956 3/2020

OTHER PUBLICATIONS

International Search Report dated Mar. 28, 2024 issued in counterpart application No. PCT/KR2023/018494, 8 pages.

(Continued)

*Primary Examiner* — Dung B Huynh

(74) *Attorney, Agent, or Firm* — The Farrell Law Firm, P.C.

(57) ABSTRACT

The disclosure relates to a 5G or 6G communication system for supporting a higher data transmission rate. A method performed by user equipment UE is disclosed, and includes receiving resource random access related configuration information, wherein the resource configuration information includes frequency domain configuration information of M random access occasions (ROs); determining resource locations of the M ROs based on the resource configuration information; and sending a random access preamble/channel at the determined resource locations.

19 Claims, 8 Drawing Sheets

(56) References Cited

U.S. PATENT DOCUMENTS

2021/0058971 A1* 2/2021 MolavianJazi ....... H04W 72/23
2021/0127429 A1* 4/2021 Huang .............. H04W 74/0891
2021/0204327 A1* 7/2021 Shi ........................ H04W 52/50
2021/0243820 A1* 8/2021 Qian ................... H04L 27/0014
2021/0298086 A1 9/2021 Jiang et al.
2021/0307060 A1* 9/2021 Agiwal ........... H04W 36/00837
2021/0329691 A1* 10/2021 Sun ..................... H04W 74/002
2021/0385756 A1* 12/2021 Zhang ................. H04W 52/367
2022/0061098 A1* 2/2022 Choi ..................... H04L 5/0094
2022/0086774 A1* 3/2022 Qian ........................ H04B 7/00
2022/0173859 A1* 6/2022 Chai ..................... H04L 5/0023
2022/0174753 A1* 6/2022 Shin .................. H04W 72/1263
2022/0191936 A1 6/2022 Shin et al.
2022/0217789 A1* 7/2022 Lee ....................... H04W 52/36
2022/0256607 A1* 8/2022 Liu ................... H04W 74/0833
2022/0312486 A1* 9/2022 Zhang ................. H04W 74/006
2022/0321166 A1* 10/2022 Kwak .................. H04B 1/7143
2022/0322207 A1* 10/2022 Agiwal ................. H04W 72/20
2022/0322256 A1* 10/2022 Cheng ............... H04W 74/0833
2022/0322454 A1* 10/2022 Choi ................. H04W 74/0833
2022/0353767 A1* 11/2022 Geng .................. H04W 52/242
2022/0361254 A1* 11/2022 Ma ........................ H04L 5/0012
2022/0369365 A1* 11/2022 Sakhnini ........... H04W 74/0841
2022/0377813 A1* 11/2022 Wang .................... H04L 1/1861
2023/0009933 A1* 1/2023 Li ......................... H04L 5/0044
2023/0060894 A1* 3/2023 Rastegardoost ..... H04B 7/0695
2023/0156818 A1* 5/2023 Wang ................ H04W 74/0866 370/329
2023/0199857 A1* 6/2023 Cao ..................... H04W 74/002 370/329
2023/0300891 A1* 9/2023 Su ....................... H04W 74/002 370/329
2023/0328721 A1* 10/2023 Ohara ................... H04L 5/0094
2023/0337287 A1* 10/2023 Yang ................... H04W 72/232
2023/0363004 A1* 11/2023 Islam ................ H04W 72/0453
2023/0413336 A1* 12/2023 Xiong ............... H04W 74/0833
2024/0032103 A1* 1/2024 Rastegardoost .. H04W 74/0833
2024/0040627 A1* 2/2024 He .................... H04W 74/0833
2024/0049278 A1* 2/2024 Cheng ............... H04W 74/0833
2024/0049294 A1* 2/2024 Xiong ................... H04W 48/08
2024/0080907 A1* 3/2024 Xu ........................ H04L 5/0094
2024/0137972 A1* 4/2024 Abdelghaffar ...... H04W 74/006
2024/0155693 A1* 5/2024 Marcone ........... H04W 74/0833
2024/0172292 A1* 5/2024 Xiong ................... H04W 74/08
2024/0224341 A1* 7/2024 Li ..................... H04W 72/0453
2024/0260088 A1* 8/2024 Yoshimura ........ H04W 74/0833
2024/0284516 A1* 8/2024 Wu .................. H04W 74/0833
2024/0323860 A1* 9/2024 Zhang ................. H04W 52/327
2024/0340965 A1* 10/2024 Xiong ............... H04W 74/0833
2024/0381444 A1* 11/2024 Han .......................... H04L 5/14
2024/0397555 A1* 11/2024 Futaki ............... H04W 74/0891
2024/0407008 A1* 12/2024 Lin ................... H04W 74/0833
2024/0414674 A1* 12/2024 Xu .................... H04W 74/0833
2025/0016840 A1* 1/2025 Sahraei ............. H04W 74/0833
2025/0024511 A1* 1/2025 Li ........................ H04B 17/328
2025/0024517 A1* 1/2025 Yang ......................... H04L 1/08
2025/0024548 A1* 1/2025 Zhao ......................... H04L 1/08
2025/0039799 A1* 1/2025 Xiao ................... H04W 52/362
2025/0048370 A1* 2/2025 Wu ................... H04W 74/0833
2025/0048435 A1* 2/2025 Yan ................... H04W 72/0453
2025/0048440 A1* 2/2025 Marcone ........... H04W 74/0833
2025/0056296 A1* 2/2025 Al ........................ H04B 17/328
2025/0168894 A1* 5/2025 Zhang ............... H04W 74/0833
2025/0267721 A1* 8/2025 Han .................. H04W 74/0833
2025/0274827 A1* 8/2025 Abdul Latheef . H04W 36/0079
2025/0279818 A1* 9/2025 Khan Beigi ......... H04B 7/0695
2025/0344170 A1* 11/2025 Khan Beigi ...... H04W 74/0833

OTHER PUBLICATIONS

European Search Report dated Jan. 15, 2026 issued in counterpart application No. 23892051.6-1206, 9 pages.

* cited by examiner

METHOD AND APPARATUS FOR CONFIRMATION OF RANDOM ACCESS RESOURCES

CROSS-REFERENCE TO RELATED APPLICATION(S)

This application is based on and claims priority under 35 U.S.C. § 119(a) to Chinese Patent Application No. 202211461038.X, which was filed in the China National Intellectual Property Administration on Nov. 17, 2022, the entire disclosure of which is incorporated herein by reference.

BACKGROUND

1. Field

The present application relates to wireless communication, and more specifically, to a method and an apparatus for confirmation of random access resources in a wireless communication system.

2. Description of the Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mm Wave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mm Wave resources and dynamic operation of slot formats, initial access technologies for supporting multi-beam transmission and broadbands, definition and operation of BWP (BandWidth Part), new channel coding methods such as an LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

According to an embodiment, there is provided a method performed by a user equipment (UE) in a wireless communication system, including determining frequency domain locations of M random access occasions (ROs), including determining the frequency domain location of a first RO, and determining the frequency domain locations of other M−1 ROs based on the frequency domain location of the first RO, wherein M is an integer greater than or equal to 1, and sending a random access preamble/channel based on the determined frequency domain locations of the M ROs.

According to an embodiment, there is provided a method performed by a base station in a wireless communication system, including sending random access resource configuration information, and receiving a random access preamble/channel, wherein the random access preamble/channel is sent based on frequency domain locations of M random access occasions (ROs), wherein the frequency domain locations of the M ROs include a frequency domain location of a first RO and the frequency domain locations of other M−1 ROs determined based on the frequency domain location of the first RO, and wherein M is an integer greater than or equal to 1.

According to an embodiment, there is provided an apparatus in a communication system, including a transceiver, and a processor coupled to the transceiver and configured to implement any method according to an embodiment of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
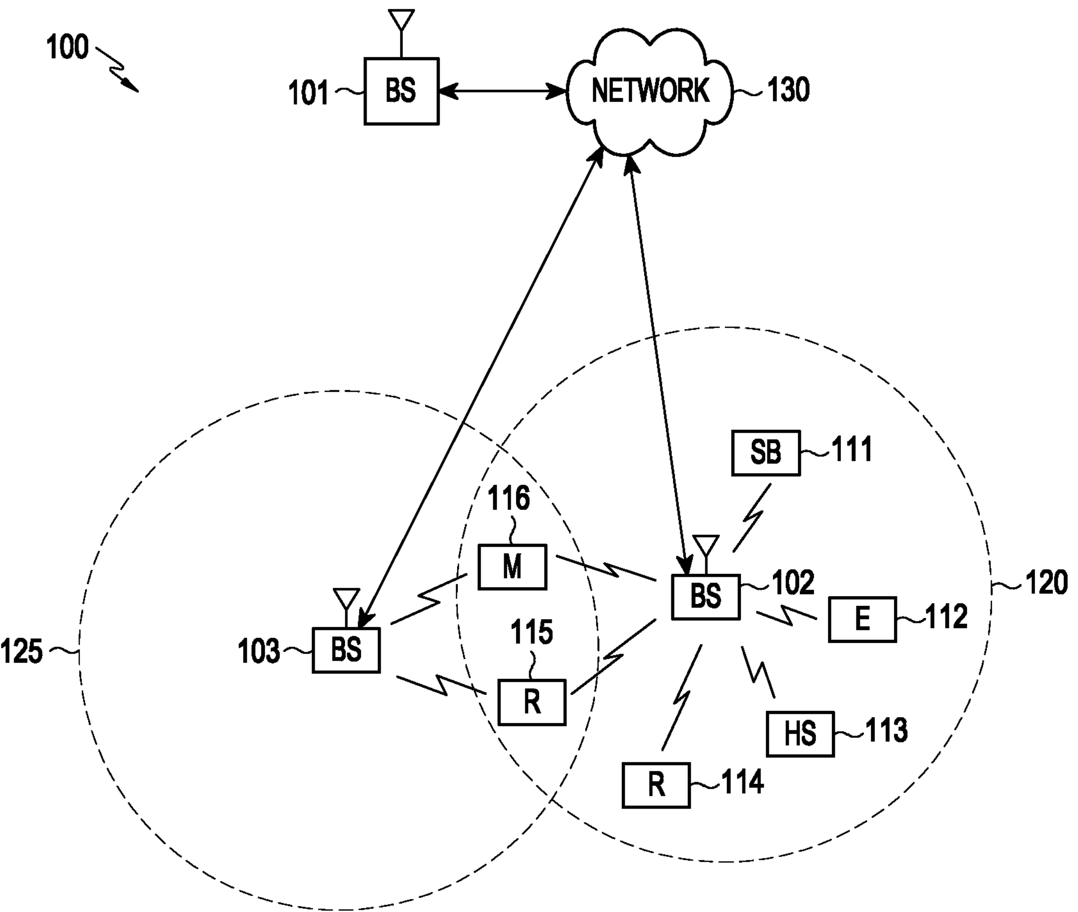
FIG. 1 shows an example wireless network according to an embodiment.

Embodiments of the present disclosure are further described below in conjunction with the accompanying drawings.

The text and figures are provided as examples only to assist the reader in understanding the present disclosure. They are not intended and should not be construed as limiting the scope of the present disclosure in any way. While certain embodiments and examples have been provided, based on what is disclosed herein it will be apparent to those skilled in the art that variations to the illustrated embodiments and examples may be made without departing from the scope of the present disclosure.

It can be understood by those skilled in the art that singular forms such as “a”, “an”, “the” and “this” as used herein may also encompass plural forms unless specifically stated. It should be further understood that phrases “comprising” as used in the specification of the present application refers to the presence of said features, integers, steps, operations, elements and/or components, but does not exclude the presence or addition of one or more other features, integers, steps, operations, elements, components and/or groups thereof. It should be understood that when we say that an element is “connected” or “coupled” to another element, it can be directly connected or coupled to the other element, or there may be an intervening element. Furthermore, “connected” or “coupled” as used herein may include wireless connection or wireless coupling. Phrases “and/or” as used herein includes all or any of the units of the one or more associated listed items and all combinations thereof.

It can be understood by those skilled in the art that unless otherwise defined, all terms (including technical terms and scientific terms) as used herein have the same meaning as commonly understood by those skilled in the art to which the present disclosure belongs. It should also be understood that terms, such as those defined in general dictionaries, should be understood to have meanings consistent with those in the context of the prior art, and will not be interpreted in an idealized or overly formal sense unless they are specifically defined as here.

It can be understood by those skilled in the art that terms such as “terminal”, “terminal equipment”, “user equipment” and “UE” as used herein include both a device of wireless signal receiver, which only has a device of wireless signal receiver without transmission capability, and a device of receiving and transmitting hardware, which has a device of receiving and transmitting hardware capable of two-way communication on a two-way communication link. Such devices may include a cellular or other communication device, with a single-line display or a multi-line display or without multi-line displays; personal communications service (PCS), which can combine voice, data processing, fax and/or data communication capabilities; personal digital assistant (PDA), which may include a radio frequency (RF) receiver, pager, Internet/Intranet access, web browser, notepad, calendar and/or global positioning system (GPS) receiver; conventional laptop and/or palmtop computer or other device having and/or including an RF receiver. As used herein, “terminal” and “terminal equipment” may be portable, transportable, installed in vehicles (aviatic, nautical and/or terrestrial), or suitable and/or configured to operate locally, and/or operate in any other location of the earth and/or space in a distributed way. As used herein, “terminal” and “terminal equipment” may also be communication terminals, Internet terminals and music/video playing terminals, such as PDAs, mobile Internet devices (MIDs) and/or mobile phones with music/video playing function, or may be devices such as smart TVs, set-top boxes, etc.

Without departing from the scope of the present disclosure, the term “send” can be used interchangeably with “transmit”, “report” and “notification”.

The text and figures are provided as examples only to assist the reader in understanding the present disclosure. They are not intended and should not be construed as limiting the scope of the present disclosure in any way. While certain embodiments and examples have been provided, based on what is disclosed herein it will be apparent to those skilled in the art that variations to the illustrated embodiments and examples may be made without departing from the scope of the present disclosure.

The following description with reference to the accompanying drawings is provided to facilitate a comprehensive understanding of various embodiments of the present disclosure as defined by the claims and their equivalents. This description comprises various specific details to facilitate understanding but should be regarded as examples only. Accordingly, those of ordinary skill in the art will recognize that various changes and modifications of the various embodiments described herein can be made without departing from the scope and spirit of the present disclosure. Also, descriptions of well-known functions and constructions may be omitted for clarity and conciseness.

The terms and phraseology used in the following specification and claims are not limited to their dictionary meanings, but are merely used to enable a clear and consistent understanding of the present disclosure. Accordingly, it should be apparent to those skilled in the art that the following description of various embodiments of the present disclosure is provided for illustration purposes only and not for the purpose of limiting the scope of the present disclosure as defined by the appended claims and their equivalents.

It should be understood that the singular forms "a", "an" and "the" comprise plural referents unless the context clearly dictates otherwise. Thus, for example, reference to "a component surface" comprises reference to one or more of such surfaces.

The terms "comprise" or "may comprise" refer to presence of a correspondingly disclosed function, operation, or component that may be used in various embodiments of the present disclosure, rather than excluding presence of one or more additional functions, operations, or features. Furthermore, the terms "comprise" or "have" may be interpreted to mean certain characteristics, numbers, steps, operations, constituent elements, components, or combinations thereof, but should not be interpreted as excluding one or more other characteristics, numbers, steps, operations, constituent elements, components, or the possibility of existence of a combination thereof.

The term "or" as used in various embodiments of the present disclosure comprises any of the listed terms and all combinations thereof. For example, "A or B" may comprise A, may comprise B, or may comprise both A and B.

Unless defined differently, all terms (including technical or scientific terms) used in the present disclosure have the same meaning as understood by one of ordinary skill in the art described in the present disclosure. Common terms as defined in dictionaries are to be interpreted to have meanings consistent with the context in the relevant technical field, and should not be interpreted ideally or overly formalized unless explicitly so defined in the present disclosure.

The solutions of the embodiments of the present application may be applied to, for example, the communication systems may comprise a global system for mobile communications (GSM) system, a code division multiple access (CDMA) system, a broadband CDMA (WCDMA) system, general packet radio service (GPRS), long term evolution (LTE) system, LTE frequency division duplex (FDD) system, LTE time division duplex (TDD), universal mobile telecommunication system (UMTS), worldwide interoperability for microwave access (WiMAX) communication system, fifth generation (5th generation, 5G) system or new radio (NR), etc. In addition, the solutions of the embodiments of the present application may be applied to future-oriented communication technologies.

FIG. 1 illustrates an example wireless network 100 according to various embodiments of the present disclosure. The embodiment of the wireless network 100 shown in FIG. 1 is for illustration purposes only. Other embodiments of the wireless network 100 can be used without departing from the scope of the present disclosure.

The wireless network 100 comprises a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this disclosure to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this disclosure to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of user equipments (UEs) within a coverage area 120 of gNB 102. The first plurality of UEs comprise a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. gNB 103 provides wireless broadband access to network 130 for a second plurality of UEs within a coverage area 125 of gNB 103. The second plurality of UEs comprises a UE 115 and a UE 116. In some embodiments, one or more of gNBs 101-103 can communicate with each other and with UEs 111-116 using 5G, LTE, LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 comprise a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can comprise any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figures 2A, 2B:
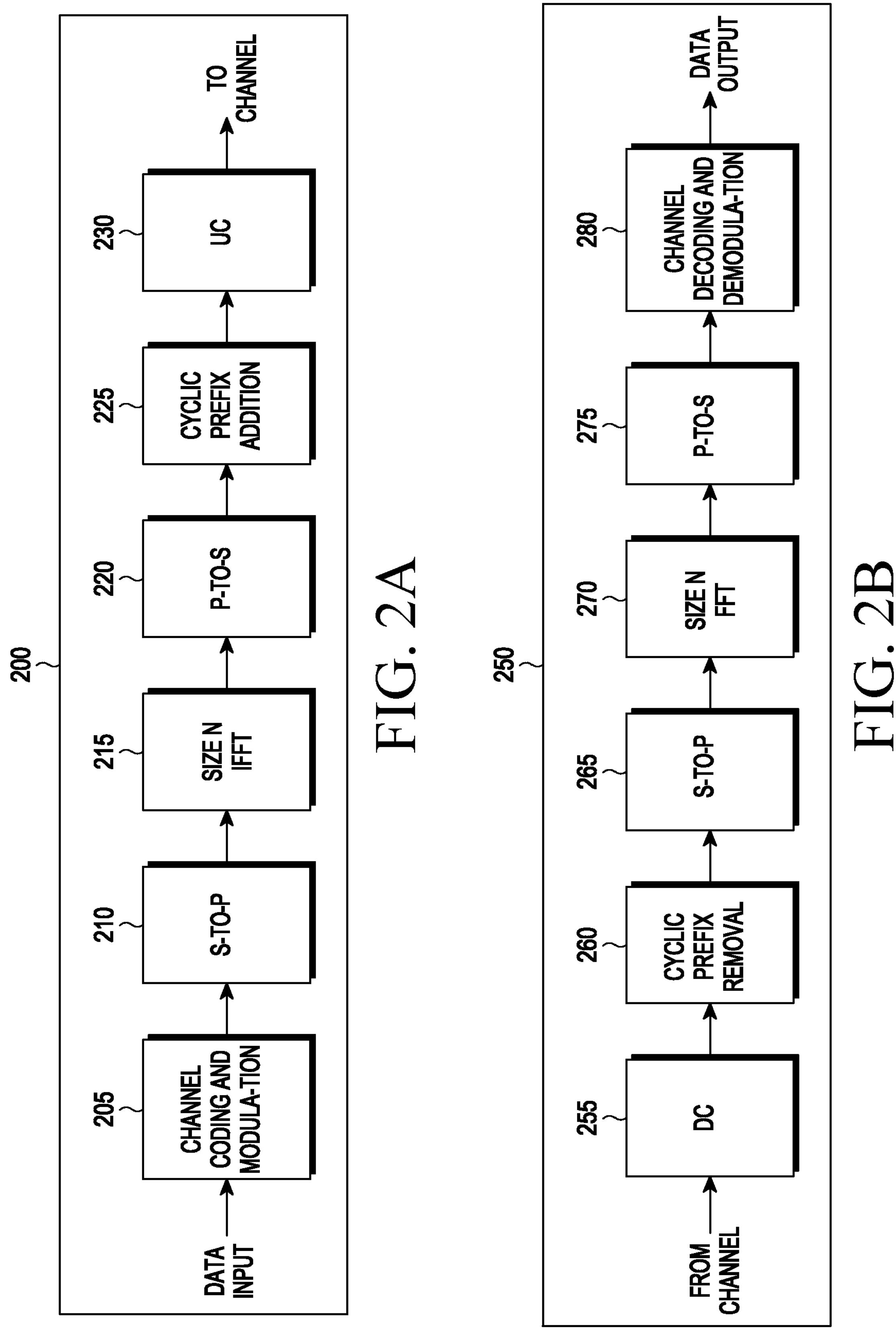
FIGS. 2A and 2B show example wireless transmission and reception paths according to an embodiment.

FIGS. 2A and 2B illustrate example wireless transmission and reception paths according to an embodiment. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in the present disclosure.

The transmission path 200 comprises a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 comprises a down-converter (DC) 255, a cyclic prefix removal block 260, a serial-to-parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols. The S-to-P block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The P-to-S block 220 converts (such as multiplexes) parallel time-domain output symbols from the size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to a radio frequency (RF) for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The S-to-P block 265 converts the time-domain baseband signal into a parallel time-domain signal. The size N FFT block 270 performs an FFT algorithm to generate N parallel frequency-domain signals. The P-to-S block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
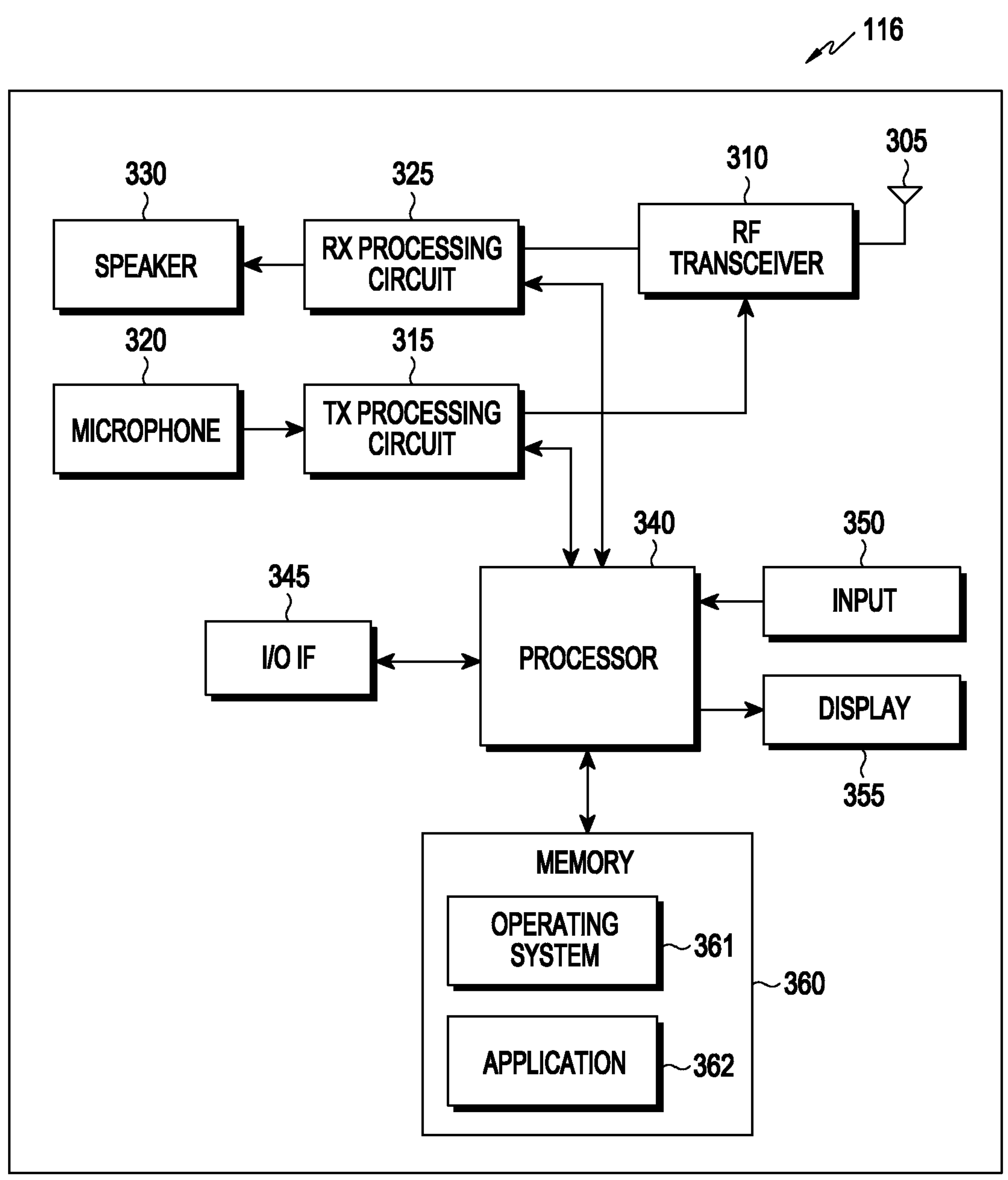
FIG. 3A shows an example user equipment and FIG. 3B shows an example base station according to an embodiment.

FIG. 3A illustrates an example UE 116 according to an embodiment. The embodiment of UE 116 shown in FIG. 3A is for illustration only, and UEs 111-115 of FIG. 1 can have the same or similar configuration. However, a UE has various configurations, and FIG. 3A does not limit the scope of the present disclosure to any specific implementation of the UE.

UE 116 comprises an antenna 305, an RF transceiver 310, a transmission (TX) processing circuit 315, a microphone 320, and a reception (RX) processing circuit 325. UE 116 also comprises a speaker 330, a processor/controller 340, an input/output (I/O) interface 345, an input device(s) 350, a display 355, and a memory 360. The memory 360 comprises an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can comprise one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 comprises at least one microprocessor or microcontroller.

The processor/controller 340 is also capable of executing other processes and programs residing in the memory 360, such as operations for channel quality measurement and reporting for systems with 2D antenna arrays as described in the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can comprise a random access memory (RAM), while another part of the memory 360 can comprise a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
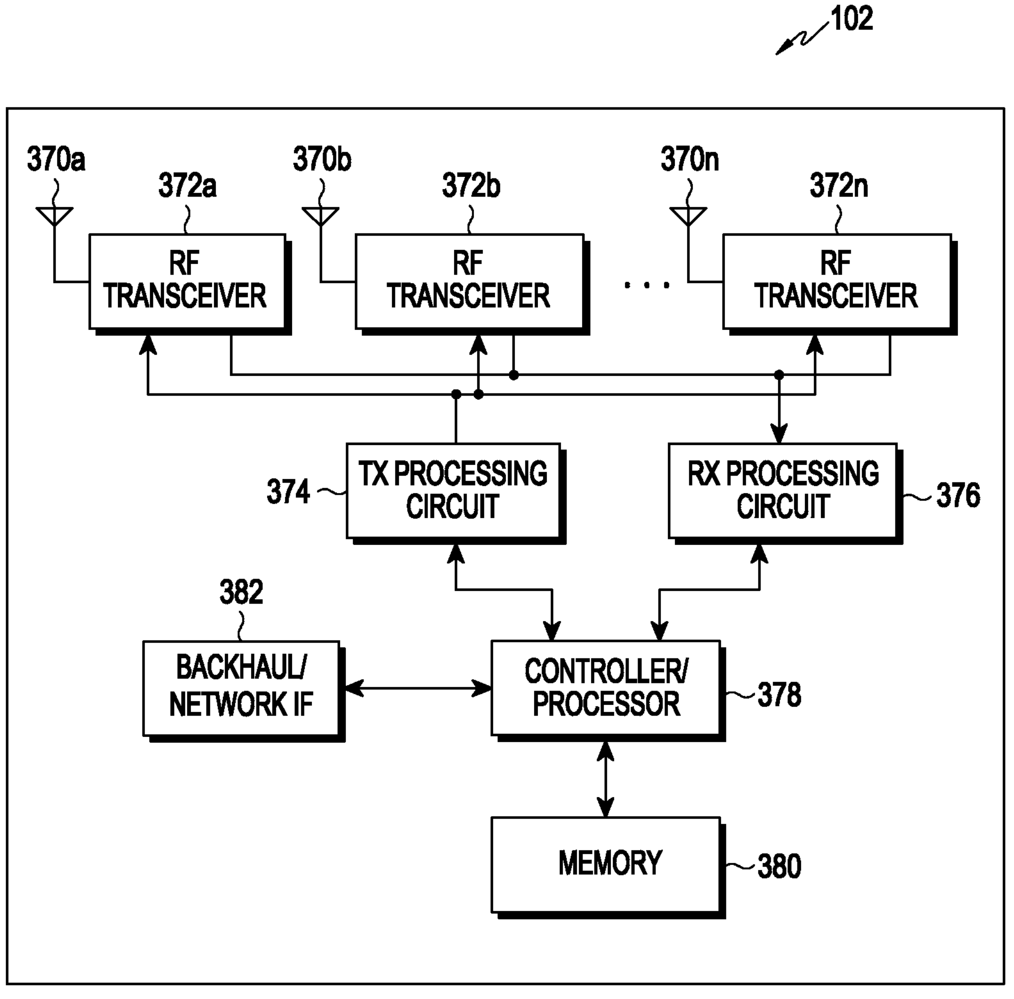

FIG. 3B illustrates an example gNB 102 according to an embodiment. The embodiment of gNB 102 shown in FIG. 3B is for illustration only, and other gNBs of FIG. 1 can have the same or similar configuration. However, a gNB has various configurations, and FIG. 3B does not limit the scope of the present disclosure to any specific implementation of a gNB. It should be noted that gNB 101 and gNB 103 can comprise the same or similar structures as gNB 102.

As shown in FIG. 3B, gNB 102 comprises a plurality of antennas 370*a*-370*n*, a plurality of RF transceivers 372*a*-372*n*, a transmission (TX) processing circuit 374, and a reception (RX) processing circuit 376. In certain embodiments, one or more of the plurality of antennas 370*a*-370*n* comprise a 2D antenna array. gNB 102 also comprises a controller/processor 378, a memory 380, and a backhaul or network interface 382.

RF transceivers 372*a*-372*n* receive an incoming RF signal from antennas 370*a*-370*n*, such as a signal transmitted by UEs or other gNBs. RF transceivers 372*a*-372*n* down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372*a*-372*n* receive the outgoing processed baseband or IF signal from TX processing circuit 374 and up-convert the baseband or IF signal into an RF signal transmitted via antennas 370*a*-370*n*.

The controller/processor 378 can comprise one or more processors or other processing devices that control the overall operation of gNB 102. For example, the controller/processor 378 can control the reception of forward channel signals and the transmission of backward channel signals through the RF transceivers 372*a*-372*n*, the RX processing circuit 376 and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm, and decode a received signal from which an interference signal is subtracted. A controller/processor 378 may support any of a variety of other functions in gNB 102. In some embodiments, the controller/processor 378 comprises at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in the present disclosure. In some embodiments, the controller/processor 378 supports communication between entities such as web real-time communications (web RTCs). The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 comprises any suitable structure that supports communication through a wired or wireless connection, such as an Ethernet or an RF transceiver.

The memory 380 is coupled to the controller/processor 378. A part of the memory 380 can comprise a RAM, while another part of the memory 380 can comprise a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372*a*-372*n*, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can comprise any number of each component shown in FIG. 3A. As a specific example, the access point can comprise many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 may comprise multiple instances of each (such as one for each RF transceiver).

The time domain unit (also called time unit) in the present disclosure may be an orthogonal frequency division multiplexing (OFDM) symbol, an OFDM symbol group (composed of a plurality of OFDM symbols), a time slot, a time slot group (composed of a plurality of slots), a subframe, a subframe group (composed of a plurality of subframes), a system frame and a system frame group (composed of a plurality of system frames); or the time unit may be an absolute time unit, such as 1 millisecond, 1 second, etc.; or the time unit may also be a combination of various granularities, such as N1 slots plus N2 OFDM symbols. In the following description, in order to describe concisely and avoid redundant description, slots are sometimes described as examples of time domain units. Therefore, it can be understood that the solutions described below with respect to slots can also be applied to other time domain units.

The frequency domain unit (also called frequency unit) in the present disclosure may be a subcarrier, a subcarrier group (composed of a plurality of subcarriers), a resource block (RB) (which may also be called a physical resource block (PRB)), a resource block group (composed of a plurality of RBs), a bandwidth part (BWP), a BWP group (composed of a plurality of BWPs), a frequency band/carrier, a frequency band group/carrier group; or the frequency unit may also be an absolute frequency domain unit, such as 1 Hz, 1 kHz, etc.; or the frequency unit may also be a combination of various granularities, such as M1 PRBs plus M2 subcarriers. In the following description, the description with respect to a kind of frequency domain unit can also be applied to other frequency domain units.

The transmission link of a wireless communication system mainly includes a downlink communication link from a 5G gNB to a UE and an uplink communication link from a UE to a network.

The transmission in wireless communication system includes transmission from a base station (gNB) to a UE (called downlink transmission), with corresponding slots called downlink slots, and transmission from a UE to a base station (called uplink transmission), with corresponding slots called uplink slots.

In the downlink communication of a wireless communication system, the system periodically sends synchronization signals and broadcast channels to users through synchronization signal/PBCH blocks (SSBs), and the corresponding periodicity is SSB periodicity, or SSB burst periodicity. In addition, the base station can configure a physical random access channel configuration periodicity (PRACH configuration periodicity), during which a certain number of random access transmission occasions (also called random access occasions, RACH occasions, or ROs) can be configured, and can satisfy that all SSBs can be mapped to corresponding ROs in an association period (a certain length of time), and in one SSB-to-RO mapping cycle, all SSBs within exactly one SSB periodicity can be mapped onto required random access resources, and there can be one or more mapping cycles within one association period. One SSB-to-RO association pattern period contains one or more association periods, and the SSB-to-RO mapping patterns in each of association pattern periods are the same.

In an NR communication system, before establishment of radio resource control (RRC), such as during random access procedure, the performance of random access directly affects the user's experience. In traditional wireless communication systems, such as LTE and LTE-Advanced systems, random access procedures are applied in many scenarios, such as initial link establishment, cell handover, uplink re-establishment, RRC connection re-establishment and so on, and are divided into contention-based random access and non-contention-free random access according to whether a user exclusively occupies the preamble sequence (also called preamble) resource. Since in contention-based random access, individual users select a preamble sequence from same preamble sequence resources when attempting to establish an uplink, it may occur that a plurality of users select the same preamble sequence to be sent to the base station, so the mechanism for conflict resolution is an important research direction in random access. To this end, how to reduce the probability of a conflict and how to quickly resolve the occurred conflicts are the key indicators that affect the performance of random access.

Figure 4:
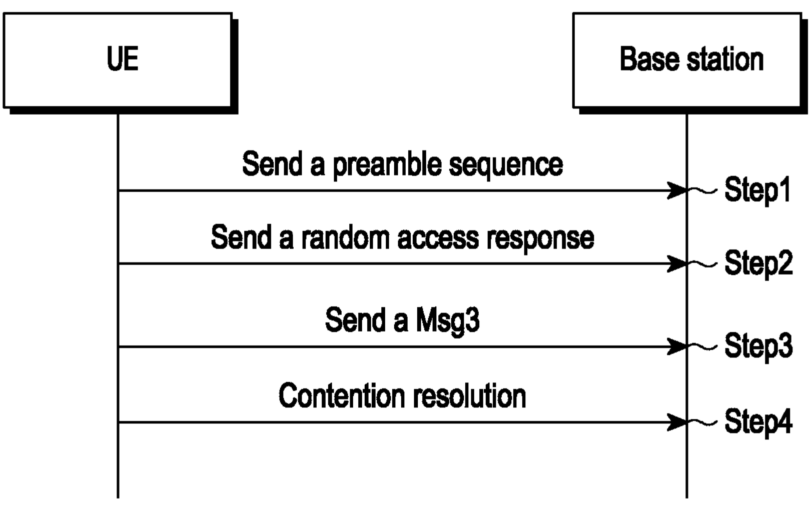
FIG. 4 shows a schematic flowchart of a contention-based random access procedure.

The contention-based random access procedure in LTE-A is divided into four steps, as shown in FIG. 4. In the first step, the user randomly selects a preamble sequence from the preamble sequence resource pool and sends it to the base station. The base station carries out correlation detection on the received signal, thereby identifying the preamble sequence sent by the user. In the second step, the base station sends a random access response (RAR) to the user, including a random access preamble sequence identifier, a timing advance instruction determined according to the estimation of time delay between the user and the base station, a cell-radio network temporary identifier (C-RNTI), and time-frequency resources allocated for the user's next uplink transmission. In the third step, the user sends a third message (message 3, Msg3) to the base station according to the information in the RAR. The Msg3 contains information such as user terminal identity and RRC link request, wherein the user terminal identity is unique to the user and used for conflict resolution. In the fourth step, the base station sends a conflict resolution identity to the user, including the identity of the user terminal that won in the conflict resolution. After detecting its own identity, the user upgrades the temporary C-RNTI to the C-RNTI, sends an ACK signal to the base station to complete the random access procedure, and waits for the scheduling by the base station. Otherwise, the user will start a new random access procedure after a delay of time.

For non-contention based random access procedure, since the base station is aware of the user identity, it can assign a preamble sequence to the user. Therefore, when sending the preamble sequence, the user does not need to randomly select the sequence, but would use the assigned preamble sequence. After detecting the assigned preamble sequence, the base station would send a corresponding random access response, including information such as timing advance and uplink resource allocation. After receiving the random access response, the user considers that the uplink synchronization has been completed, and waits for further scheduling by the base station. Therefore, a non-contention based random access procedure only includes two steps: Step 1: sending a preamble sequence; and Step 2: sending of a random access response.

The random access procedure in LTE is applicable for the following scenarios:

1. initial access in RRC_IDLE;
2. RRC connection re-establishment;
3. cell handover;
4. arrival of downlink data in RRC-connected state and request for random access procedure (when the uplink is asynchronous);
5. arrival of uplink data in RRC-connected state and request for random access procedure (when the uplink is asynchronous or no resources in PUCCH resources are allocated to the scheduling request); and
6. positioning.

In some network systems, such as 5G NR systems, because new frequency ranges (such as FR2) are enabled and power is limited, a problem of insufficient uplink coverage in random access may occur. Therefore, how to improve the uplink coverage capability of random access signals is a problem required to be solved.

In order to improve the uplink coverage capability of random access signals, sending a plurality of random access channels/preambles in one random access attempt may be considered. Thus, one random access attempt may involve one or more random access occasions (ROs). In addition, the time domain/frequency domain locations of the plurality of ROs in one random access attempt may be properly configured or determined to further improve the performance of random access signals. For example, by properly arranging or configuring the frequency domain locations of the plurality of ROs in one random access attempt, the frequency diversity gain of the random access signals transmitted by the UE can be improved, thereby enhancing the performance of the random access signals.

The present disclosure provides a method and an apparatus for configuring or determining random access resources, which includes sending, by a base station to a UE, random access configuration information, in which the base station can indicate information about configured random access resources to the UE; obtaining, by the UE in a certain way, the random access configuration information of the base station, after which the UE determines resources for random access according to the obtained configuration information and/or certain rules, in particular determines frequency domain resource locations corresponding to ROs corresponding to transmission of a plurality of random access preambles.

It should be understood that in the description of the present disclosure, the frequency domain location of the RO mentioned may refer to the frequency domain starting location, frequency domain ending location, or specific frequency domain location of the RO. In the following, the starting location is taken as an example in most cases, but it should be understood that this is only for brevity and to avoid redundancy, and it is not intended to limit the principle of the involved technical solution only to the case where the frequency domain location is the frequency domain starting location of the RO, but the description can also be applied to cases in which, without conflict, the frequency domain location of the RO refers to the frequency domain ending location of the RO or a specific frequency domain location (e.g., intermediate location, etc.).

In an embodiment, a method for determining random access resource configuration will be introduced, which is beneficial to better obtain frequency domain diversity gain when sending a plurality of preambles in one random access attempt. In the present disclosure, sending one or more preambles and sending one or more random access channels (PRACHs) can be used interchangeably; in the wireless network system, the UE may carry out a random access for various purposes (such as initially accessing the system, obtaining the uplink synchronization information, etc.); whereas carrying out the random access requires the UE to determine available random access resources. According to an embodiment, the operations of the UE may include:

Receiving random access related resource configuration information, wherein the random access related resource configuration information may be received from a base station or from other network-side nodes, and may include at least one of:

Random access time domain related configuration information, including at least one of:

Random access configuration index, wherein the configuration index may indicate a random access preamble format, and/or random access configuration periodicity, and/or time unit index of random access over a certain length of time (e.g., the certain length of time may be, for example, but not limited to, 10 ms, and the time unit index may be, for example, but not limited to, time slot 1, 4 and 7), the number of random access occasions (ROs) in one time unit and/or the starting locations of the time units of the ROs and/or the number of occupied time units.

The number of random access preambles N that can be sent and/or the number of random access channels N that can be sent and/or the number of random access occasions N that can be used to send preambles, in one random access attempt. The one random access attempt may be replaced by one or more associated (or alternatively called mapped) SSB, that is, the random access time domain related configuration information may include; where N is a positive integer, which may be 1, and/or 2, and/or 4, and/or 8; or may be other positive integers greater than 1.

In addition, it should be understood that the SSB can be replaced by other downlink beam signals, including CSI-RS, PRS, TRS, etc.

Random access frequency domain related configuration information, including at least one of:

- The starting location of the frequency domain unit of the first RO on the frequency domain, including absolute frequency value indication and/or gap frequency domain unit value relative to a frequency domain reference point;
- The number of gap frequency domain units between adjacent ROs on the frequency domain;
- The number of ROs N_RO_FDM frequency-division multiplexed at the same time, optionally, the number of frequency-division multiplexed ROs may be within a frequency domain range, such as within one BWP, or within one RB set (or PRB set), or within another frequency domain unit range; where N_RO_FDM is a positive integer, such as 1, and/or 2, and/or 4, and/or 8; or other positive integers greater than 1.

Optionally, when N random access preambles can be sent in one random access attempt (where N is a positive integer, which may be 1, and/or 2, and/or 4, and/or 8, or other positive integers greater than 1), the above random access frequency domain related configuration information may further include:

Indication information of frequency domain locations of M random access occasions for sending the N random access preambles, where M is a positive integer, e.g., may be 1, and/or 2, and/or 4, and/or 8, or other positive integers greater than 1.

In an implementation, M may be equal to N, that is, in one random access attempt, one random access preamble is sent on one RO; and in another implementation, M may be less than N, that is, in one random access attempt, a plurality of random access preambles are sent on one RO.

Information about frequency domain locations of the M random access occasions may be determined according to at least one of the following ways:

The starting locations of frequency domain units of the M ROs are configured separately, that is, each RO has its own frequency domain unit starting location. In an implementation, the UE may determine the starting location of the frequency domain unit of each of the M ROs based on the received random access frequency domain related configuration information. For example, the random access frequency domain related configuration information may include information for indicating the frequency domain starting locations of each of the M ROs;

The starting locations of frequency domain units of the M ROs are obtained according to a certain pattern rule, and obtaining the starting locations of frequency domain units of the M ROs according to a certain pattern rule comprises the following steps:

Determining a first RO, wherein the first RO includes the RO in which the first preamble of the N random access preambles is located and/or the first RO of the M ROs, wherein "first" may refer to the earliest or latest one in time, the one with the largest or smallest frequency domain index, or may refer to a reference RO that can be determined in other ways; the specific determination method may include that the UE determines the "first RO" according to the RO mapped by the selected SSB, where the "selected SSB" may refer to the SSB related to the RO selected by the UE according to certain rules (e.g., according to RSRP threshold), the descriptions below may be referred to for the detailed description thereof. Optionally, when there is more than one RO mapped by the selected SSB, the UE randomly selects one, and/or selects the earliest available RO in time, as the first RO. Optionally, when there is more than one RO mapped by the selected SSB at the same time (i.e., there are a plurality of ROs on frequency domain), the UE randomly selects one with equal probability, and/or selects the one with the largest or smallest frequency domain unit index on frequency domain, as the first RO.

Figure 5:
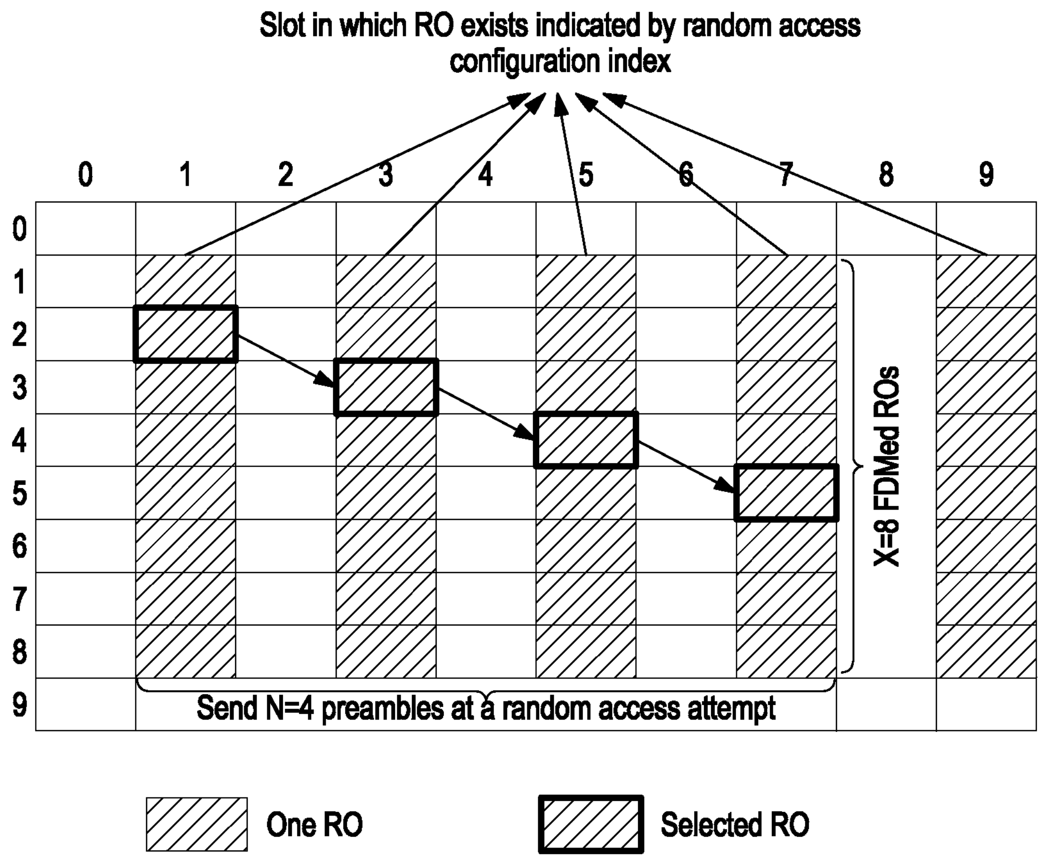
FIG. 5 shows an example method for determining frequency domain locations of a plurality of random access occasions (ROs) in one random access attempt according to an embodiment.

According to the determined first RO, the UE determines the frequency domain starting locations of the subsequent M−1 ROs, including sequentially determining the frequency domain starting locations of the M−1 ROs in ascending or descending manner, among the N_RO_FDM frequency division multiplexed ROs configured on frequency domain, with the first RO as the starting point. As illustrated in FIG. 5, the random access configuration index indicates that the time slot indexes of the ROs present on time domain are 1, 3, 5, 7, and 9 (time slot indexes within 10 ms), and 8 (N_RO_FDM=8) FDMed ROs are configured on frequency domain; when the UE is configured to send 4 (N=4) random access preambles in one random access attempt, the UE selects 4 (M=4) ROs (e.g., 1, 3, 5, and 7 from the slot index set {1, 3, 5, 7, 9} as shown in FIG. 5), and then randomly selects, according to equal probability, the second RO on frequency domain on the first slot (slot 1 in the example of FIG. 5), as the first RO, and then determines the frequency domain locations of the ROs on subsequent slots in ascending order on frequency domain (e.g., being adjacent in frequency domain as shown in FIG. 5), that is, obtains the resource location information of the ROs determined to be used in this attempt.

In an implementation, if the obtained frequency domain location of RO has reached or exceeded the boundary value (such as the frequency domain maximum or minimum value of the FDMed N_RO_FDM ROs or a configured boundary value), the frequency domain location of this RO and/or the subsequent ROs starts from the minimum or maximum value.

It should be understood that the schematic diagram of determining frequency domain locations of M ROs shown in FIG. 5 is merely an example. The frequency domain locations of the M ROs selected by the UE may be discontinuous at the frequency domain locations of N_RO_FDM candidate ROs, for example, the frequency domain locations of the ROs on adjacent slots among the selected M ROs are separated from each other by a certain frequency domain gap. The indication information of the frequency domain gap may be included in the random access frequency domain related configuration information received by the UE.

In an implementation, the frequency domain locations of the M ROs may be determined by a certain calculation method, which includes that the frequency domain location index $RO_{f\_x}$ of the X-th RO in one random access attempt may be obtained by the following equation:

$$RO_{f\_x}=RO_{f\_1} \text{ when } X=1,$$

wherein the $RO_{f\_1}$ is determined by the above method for determining the first RO;

$$RO_{f\_x}=(RO_{f\_(x-1)}+Y)\bmod(N\_RO\_FDM) \text{ when } X \text{ is not equal to 1 or greater than 1,}$$

wherein Y represents the size of frequency domain location index gap between adjacent ROs in one random access attempt, e.g., Y=1 or other positive integer, and the Y value is predefined and/or configured by base station equipment.

In an implementation, the random access frequency domain related configuration information received by the UE may include indication information about the Y (i.e., indication information of frequency domain gap between adjacent ROs). In addition, if in descending order, +Y in the above equation may be replaced by −Y.

Figure 6:
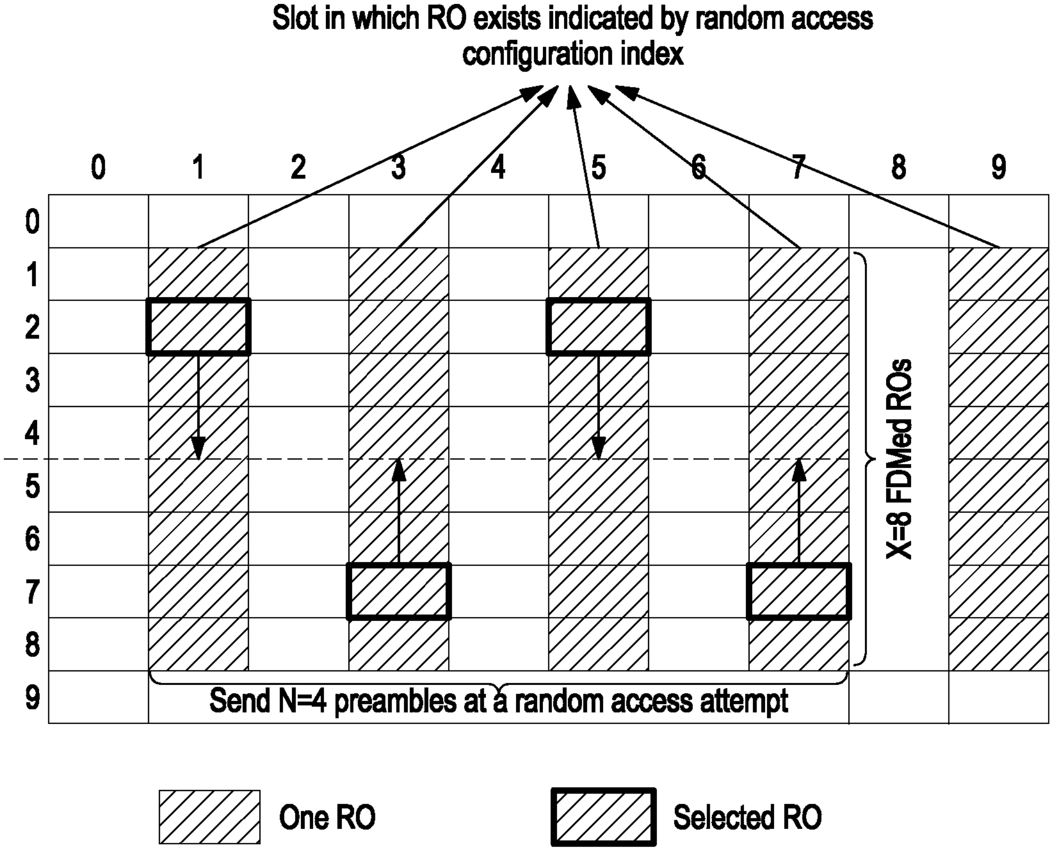
FIG. 6 shows an example method for determining frequency domain locations of a plurality of ROs in one random access attempt according to an embodiment.

In an implementation, the frequency domain locations of ROs are determined by certain rules; the rules include determining, according to a predefined and/or configured frequency domain reference location, which includes a center location (i.e., a location at half the size of BWP) of a frequency domain unit (introduced by taking a BWP as an example) and/or a frequency domain location with a proportion R, where R includes a fractional value from 0 to (inclusive) 1, such as ¼, ⅛, etc.; the "determine according to a predefined and/or configured frequency domain reference location" includes determining according to a frequency domain location of a determined RO (the frequency domain location includes the starting location and/or ending location in frequency domain of the RO and/or a specific location, such as an intermediate location) and a number of frequency domain units GAP (GAP is a non-negative integer, such as 0, 1, etc.) between the frequency domain location of the determined RO and the frequency domain reference location, e.g., the frequency domain location of another RO is obtained taking the frequency domain reference location as the symmetry axis, wherein the frequency domain gap between the obtained frequency domain location of the other RO and the frequency domain reference location is also GAP frequency domain units; as shown in FIG. 6, the frequency domain ending location of the determined RO as the above-mentioned first RO is 2 frequency domain units from the frequency domain reference location with R=½ BWP; then the frequency domain starting location of the subsequent adjacent RO is on the symmetry plane of the frequency domain reference location and is also 2 frequency domain units away from the frequency domain reference location.

In the example shown in FIG. 6, the gaps between adjacent ROs among the determined M ROs are the same as each other, with each gap being 2*GAP. In an implementation, the random access frequency domain related configuration information received by the UE may include indication information about the GAP or 2*GAP (i.e., indication information about the frequency domain gap between adjacent ROs).

In an implementation, the frequency domain unit starting locations or frequency domain locations of the M ROs may be determined according to predefined pattern or pattern set information and/or configured pattern or pattern set information. For example, if 4 ROs are sent in one random access attempt, the frequency domain location indexes of the 4 ROs may be selected from W predefined pattern sets (W is a positive integer, e.g., 4), e.g., pattern 1 {1, 2, 3, 4}, pattern 2 {2, 3, 4, 1}, pattern 3 {3, 4, 1, 2} and pattern 4 {4, 1, 2, 3}; the selection includes randomly selecting one from a pattern set by the UE with equal probability.

Throughout the description herein, the RO may be replaced by a valid RO, or an RO mapped to SSB/CSI-RS, and/or an RO with associated PUSCH resources.

According to an embodiment, the operations of the UE may further include:

Sending a plurality of random access preambles in one random access attempt according to the received random access related resource configuration information and/or the determined ROs; optionally, in the aforementioned "UE determines according to the ROs mapped by the selected SSB", the selected SSB may be the SSB selected by the UE through the measurement of the SSB and according to the measurement result, and the number of the ROs mapped by the selected SSB is obtained by at least a combination of at least one of the following methods:

According to a first SSB-RSRP threshold, when the measured SSB-RSRP is greater than or not less than the first SSB-RSRP threshold, the UE does not send a plurality of preambles (and/or PRACHs) (in one random access attempt), and/or the UE sends a single preamble (and/or PRACH) (in one random access attempt), otherwise (or when the measured SSB-RSRP is not greater than or less than the first SSB-RSRP threshold), the UE sends a plurality of preambles (and/or PRACHs) (in one random access attempt), and/or the UE does not send a single preamble (and/or PRACH) (in one random access attempt); wherein the first SSB-RSRP threshold may be a threshold for selecting SSB, and/or a specially configured SSB-RSRP threshold for selecting whether to send a single or a plurality of random access preambles (and/or PRACHs);

Whether to send a single or a plurality of random access preambles (and/or PRACHs) and/or a number of random access preambles (and/or PRACHs) that can be sent among the plurality of random access preambles (and/or PRACHs) may be determined according to K SSB-RSRP thresholds; comprising: when the SSB-RSRP measured by the UE is between two adjacent SSB-RSRP thresholds, a number of random access preambles (and/or PRACHs) that can be sent may be determined according to the number of random access preambles (and/or PRACHs) that can be sent corresponding to the SSB-RSRP threshold interval; for example, for K=2, there are SSB-RSRP threshold A and SSB-RSRP threshold B, wherein the SSB-RSRP threshold A is greater than the SSB-RSRP threshold B, and when the SSB-RSRP measured by the UE is higher than the SSB-RSRP threshold A, the operations are above (such as only a single preamble is sent, the UE will not send a plurality of preambles (and/or PRACHs) (in one random access attempt), and/or the UE sends a single preamble (and/or PRACH) (in one random access attempt) and/or the UE determines that the number of random access preambles (and/or PRACHs) that can be sent is N0, e.g., N0=1; otherwise, when the SSB-RSRP measured by the UE is not higher than or lower than the SSB-RSRP threshold A and higher than the SSB-RSRP threshold B, the UE determines that the number of random access preambles (and/or PRACHs) that can be sent is N1, e.g., N1=2; otherwise (i.e., when the SSB-RSRP measured by the UE is not higher than or lower than the SSB-RSRP threshold B), the UE determines that the number of random access preambles (and/or PRACHs) that can be sent is N2, e.g., N2=4; where NO, N1 and N2 are the numbers of random access preambles (and/or PRACHs) that can be sent corresponding to the K SSB-RSRP thresholds, and NO, N1 and N2 are positive integers and/or positive integers greater than or equal to 1.

In an implementation, the relationship between the SSB-RSRP threshold and the number of random access preambles/PRACHs that can be sent may be configured by the base station or may be predefined.

It should be understood that in addition to the SSB-RSRP threshold, other measured values related to the SSB and corresponding thresholds may be used, all of which are within the scope of the present disclosure.

After one or more or all preambles are sent, the UE may monitor the feedback from the base station (such as RAR, and/or PDSCH carrying RAR, and/or PDCCH scheduling the PDSCH carrying RAR). If the feedback from the base station is obtained but no correct (and/or matched) preamble index is obtained in the obtained feedback, and/or no feedback from base station is obtained, and/or the transmission counter for random access preamble (and/or the transmission attempt counter for random access preamble) does not reach or exceed the predefined and/or base station configured threshold, the UE may perform retransmission and/or reattempt of preambles. When the UE needs to retransmit and/or reattempt preambles (and/or PRACHs), when the UE determines the transmission power of the retransmitted and/or reattempted preambles (and/or PRACHs), the power ramping may be carried out according to a certain power ramping step size.

In an implementation, information related to power ramping step size includes a predefined and/or base station configured first power ramping step size value (e.g., X dB) and/or a plurality of power ramping step size values corresponding to N SSB-RSRP thresholds, e.g., N+1 power ramping step size values corresponding to N SSB-RSRP thresholds, wherein different threshold intervals corresponding to the N SSB-RSRP thresholds respectively correspond to one of the N+1 power ramping step size values; wherein a method for determining the plurality of power ramping step size values corresponding to the N SSB-RSRP thresholds includes configuring and/or predefining the plurality of power ramping step size values separately and/or determining according to the first power ramping step size value and the gap X_gap between the power ramping step size values adjacent in size, for example, if the first power ramping step size value is X dB, the second power ramping step size value is X+X_gap dB; the P-th power ramping step size value is X+(P−1)*X_gap dB. In an implementation, the information related to power ramping step size may be predefined, or configured by the base station.

It should be understood that the above embodiment related to power ramping step size may be combined with the aforementioned embodiment of determining frequency domain locations of M ROs, or may be implemented separately.

According to an embodiment, a method of random access configuration is provided. The base station or other nodes on the network side may send random access resource related configuration information to the UE. According to the received random access resource related configuration information, the UE may determine the time-frequency domain locations of ROs where the preambles or PRACHs to be sent in one random access attempt are located, or may determine the time-frequency domain locations of ROs corresponding to the associated SSB. The frequency domain locations used for sending preamble or the PRACH have patterns for spacing apart from each other, so that the uplink coverage capability of the random access signal sent by the UE is enhanced and/or the frequency diversity increase is improved.

According to an embodiment, the correspondence between the threshold of the measured value of the downlink beam signal (described by taking SSB as an example) and the number of preambles or PRACHs that can be sent in one random access attempt is established. Therefore, according to different threshold intervals where the quality of the received downlink beam signal is located, the UE may send different numbers of preambles or PRACH. In this way, the success rate of sending random access signals by the UE can be improved, the uplink coverage ratio of random access signals can be improved more in line with actual communication environment, the resource utilization rate can be improved, and various other benefits can be obtained.

According to an embodiment, the correspondence between the power ramping step size and the threshold of the measured value of the downlink beam signal (described by taking SSB as an example) is established. When the UE needs to increase the transmission power during the retransmission or reattempting of the random access preambles/PRACHs, the corresponding power ramping step size is determined according to the threshold interval where the measured value of the downlink beam signal (described by SSB as an example) is located. In this way, the transmission power of random access preamble/PRACH may be adjusted in line with actual communication environment, so as to better realize a balance between resource utilization and signal transmission quality.

Figure 7:
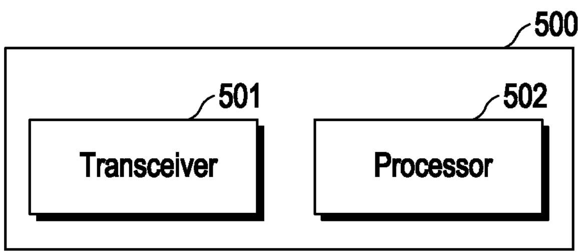
FIG. 7 shows an example hardware configuration of an apparatus that can implement various methods according to an embodiment.

Referring now to FIG. 7, this embodiment provides an apparatus 500 for configuring random access resources or determining random access resource configuration. This apparatus includes a transceiver 501 and a processor 502, which may also be called a controller or another expression of an element capable of processing data or information or controlling operations. In addition, optionally, this apparatus may further include a memory. The memory has stored thereon computer executable instructions which, when executed by the processor 502, perform at least one method corresponding to the above-mentioned respective embodiments of the present disclosure. The above are only embodiments and are not used to limit the present disclosure. Any modification, equivalent substitution, improvement, etc., made within the spirit and principle of the present disclosure should be included within the scope of protection.

Those skilled in that art will understand that the present disclosure provides devices for performing one or more of the operations described in the present disclosure. Such devices can be specially designed and manufactured for required purposes, or can also include known devices in general-purpose computers. Such devices have stored therein computer programs, which are selectively activated or reconfigured. Such computer programs may be stored in device (e.g., a computer) readable medium, or in any type of medium suitable for storing electronic instructions and respectively coupled to a bus, wherein the computer readable medium includes but not limited to any type of disk (including floppy disk, hard disk, optical disk, CD-ROM, and magneto-optical disk), ROM, RAM, EPROM, EEPROM, flash memory, magnetic card or optical card. That is, a readable medium includes any medium in which information is stored or transmitted by a device (e.g., a computer) in a readable form.

It can be understood by those skilled in the art that each block in these structural diagrams and/or block diagrams and/or flow diagrams and combinations of blocks in these structural diagrams and/or block diagrams and/or flow diagrams can be implemented using computer program instructions. It can be understood by those skilled in the art that these computer program instructions can be provided to a general-purpose computer, a professional computer or a processor of another programmable data processing method for implementation, so that the solution specified in the block or blocks of the structural diagram and/or block diagram and/or flow diagram disclosed herein can be executed by the computer or the processor of another programmable data processing method.

It can be understood by those skilled in the art that the steps, measures and solutions in various operations, methods and flows already discussed in the present disclosure can be alternated, altered, combined or deleted. Further, other steps, measures and solutions in the various operations, methods and flows already discussed herein can also be alternated, altered, rearranged, decomposed, combined or deleted. Further, the steps, measures and solutions in various operations, methods and flows disclosed herein in the prior art can also be alternated, altered, rearranged, decomposed, combined or deleted.

While the disclosure has been shown and described with reference to various embodiments thereof, it will be understood by those skilled in the art that various changes in form and details may be made therein without departing from the spirit and scope of the of the disclosure as defined by the appended claims and their equivalents.

What is claimed is:

1. A method performed by a user equipment (UE) in a wireless communication system, comprising:

receiving, from a base station, random access resource configuration information including information of a frequency domain gap between adjacent random access occasions (ROs);

determining a frequency domain location of a first RO;

determining frequency domain locations of other M−1 ROs based on the frequency domain location of the first RO and the frequency domain gap, wherein M is an integer greater than or equal to 2, gaps between the adjacent ROs among M ROs are the same as each other, and a frequency domain starting location of a subsequent RO adjacent to an RO among the M ROs is on a symmetry plane of a frequency domain reference location; and transmitting a random access preamble based on the determined frequency domain locations of the M ROs.

2. The method according to claim 1, wherein determining the frequency domain location of the first RO comprises at least one of:

determining the frequency domain location of the first RO based on frequency domain location information of the first RO, wherein the frequency domain location information of the first RO is included in the random access resource configuration information; and determining the frequency domain location of the first RO according to ROs mapped by a selected synchronization signal/PBCH block (SSB).

3. The method according to claim 2, wherein the first RO is a random one among ROs mapped by the selected SSB, or an earliest one available in time, or a random one at the same time, or one with the largest frequency domain unit index, or one with the smallest frequency domain unit index.

4. The method according to claim 1, wherein the determining the frequency domain locations of the other M−1 ROs based on the frequency domain location of the first RO comprises:

determining the frequency domain locations of the M−1 ROs based on the reference frequency domain location, according to the frequency domain location of the first RO, wherein the reference frequency domain location is predetermined or included in the random access resource configuration information.

5. The method according to claim 1, wherein the random access resource configuration information further includes time domain configuration information, and the time domain configuration information includes at least one of:

a random access configuration index, used for indicating at least one of random access preamble format, random access configuration periodicity, a time unit index of random access over a time period, a number of ROs in a time unit, starting location of a time unit, and a number of occupied time units; and a number of random access preambles N that can be sent in one random access attempt, where N is an integer greater than or equal to 1.

6. The method according to claim 1, wherein the determining the frequency domain locations of the M ROs comprises:

receiving random access resource configuration information; and determining the frequency domain locations of the M ROs based on the random access resource configuration information, wherein the random access resource configuration information includes at least one of:

frequency domain location information of each of the M ROs;

frequency domain location pattern information of the M ROs.

7. The method according to claim 1, further comprising:

transmitting a plurality of random access preambles or transmitting one random access preamble based on a measurement result of an SSB.

8. The method according to claim 7, wherein the transmitting the plurality of random access preambles or the transmitting the one random access preamble comprises:

sending a plurality of random access preambles or sending one random access preamble based on a result of comparison between the measurement result of the SSB and a first threshold; and sending a plurality of random access preambles or sending one random access preamble based on a result of comparison between the measurement result of the SSB and a plurality of thresholds.

9. The method according to claim 1, further comprising:

performing power ramping according to a power ramping step size, in a case of retransmitting the random access preamble/channel, wherein the power ramping step size is determined by at least one of:

a predefined power ramping step size;

a power ramping step size configured by the base station;

a power ramping step size corresponding to a threshold of a measurement result of an associated SSB; and determining the power ramping step size according to a first power ramping step size and a step size gap value.

10. A method performed by a base station in a wireless communication system, comprising:

transmitting random access resource configuration information including information of a frequency domain gap between adjacent random access occasions (ROs); and receiving, from a user equipment (UE), a random access preamble based on the random access resource configuration information, wherein the random access preamble is transmitted based on frequency domain locations of M ROs, wherein the frequency domain locations of the M ROs include a frequency domain location of a first RO and the frequency domain locations of other M−1 ROs determined based on the frequency domain location of the first RO and the frequency domain gap, wherein M is an integer greater than or equal to 2, and wherein gaps between the adjacent ROs among the M ROs are the same as each other, and a frequency domain starting location of a subsequent RO adjacent to an RO among the M ROs is on a symmetry plane of a frequency domain reference location.

11. The method according to claim 10, wherein the random access resource configuration information includes information of frequency domain location of the first RO, and wherein the frequency domain location of the first RO is determined based on the frequency domain location information of the first RO and/or ROs mapped by a synchronization signal/PBCH block (SSB).

12. The method according to claim 11, wherein the first RO is a random one among the ROs mapped by the SSB, or an earliest one available in time, or a random one at the same time, or one with the largest frequency domain unit index, or one with the smallest frequency domain unit index.

13. The method according to claim 10, wherein the random access resource configuration information includes information of frequency domain gap between adjacent ROs, and wherein the frequency domain locations of the other M−1 ROs are determined based on the frequency domain gap, according to the frequency domain location of the first RO.

14. The method according to claim 10, wherein the frequency domain locations of the M−1 ROs are determined based on the reference frequency domain location, according to the frequency domain location of the first RO, and wherein the reference frequency domain location is predefined or included in the random access resource configuration information.

15. The method according to claim 10, wherein the random access resource configuration information includes time domain configuration information, and the time domain configuration information includes at least one of:

a random access configuration index, used for indicating at least one of a random access preamble format, random access configuration periodicity, a time unit index of random access over a time period, a number of ROs in a time unit, starting location of a time unit, and a number of occupied time units; and a number of random access preambles N that can be sent in one random access attempt, where N is an integer greater than or equal to 1.

16. The method according to claim 10, wherein the random access resource configuration information includes at least one of:

frequency domain location information of each of the M ROs; and frequency domain location pattern information of the M ROs, wherein the frequency domain locations of the M ROs are determined based on the random access resource configuration information.

17. A user equipment (UE) in a wireless communication system, comprising:

a transceiver, and a processor coupled to the transceiver and configured to:

receive, from a base station, random access resource configuration information including information of a frequency domain gap between adjacent random access occasions (ROs), determine a frequency domain location of a first RO, determine frequency domain locations of other M−1 ROs based on the frequency domain location of the first RO and the frequency domain gap, wherein M is an integer greater than or equal to 2, gaps between the adjacent ROs among M ROs are the same as each other, and a frequency domain starting location of a subsequent RO adjacent to an RO among the M ROs is on a symmetry plane of a frequency domain reference location, and transmit a random access preamble based on the determined frequency domain locations of the M ROs.

18. The UE according to claim 17, wherein the processor is configured to:

determine the frequency domain location of the first RO based on frequency domain location information of the first RO, wherein the frequency domain location information of the first RO is included in random access resource configuration information sent by a base station, and determine the frequency domain location of the first RO according to ROs mapped by a selected synchronization signal/PBCH block (SSB).

19. A base station in a wireless communication system, comprising:

a transceiver, and a processor coupled to the transceiver and configured to:

transmit random access resource configuration information including information of a frequency domain gap between adjacent random access occasions (ROs), and receive, from a user equipment (UE), a random access preamble based on the random access resource configuration information, wherein the random access preamble is transmitted based on frequency domain locations of M ROs, wherein the frequency domain locations of the M ROs include a frequency domain location of a first RO and the frequency domain locations of other M−1 ROs determined based on the frequency domain location of the first RO and the frequency domain gap, wherein M is an integer greater than or equal to 2, and wherein gaps between the adjacent ROs among the M ROs are the same as each other, and a frequency domain starting location of a subsequent RO adjacent to an RO among the M ROs is on a symmetry plane of a frequency domain reference location.

* * * * *